(12) United States Patent
Yanase

(10) Patent No.: US 9,377,095 B2
(45) Date of Patent: Jun. 28, 2016

(54) DIFFERENTIAL DEVICE

(71) Applicant: MUSASHI SEIMITSU INDUSTRY CO., LTD., Toyohashi-shi, Aichi (JP)

(72) Inventor: Yoichi Yanase, Toyohashi (JP)

(73) Assignee: Musashi Seimitsu Industry Co., Ltd., Aichi (JP)

(*) Notice: Subject to any disclaimer, the term of this patent is extended or adjusted under 35 U.S.C. 154(b) by 0 days.

(21) Appl. No.: 14/611,462

(22) Filed: Feb. 2, 2015

(65) Prior Publication Data
US 2015/0219198 A1    Aug. 6, 2015

(30) Foreign Application Priority Data

Feb. 3, 2014   (JP) .................................. 2014-018886

(51) Int. Cl.
| | |
|---|---|
| F16H 57/037 | (2012.01) |
| F16H 48/38 | (2012.01) |
| F16H 48/40 | (2012.01) |
| F16H 48/08 | (2006.01) |

(52) U.S. Cl.
CPC ............... *F16H 48/40* (2013.01); *F16H 48/08* (2013.01); *F16H 2048/082* (2013.01); *F16H 2048/405* (2013.01)

(58) Field of Classification Search
CPC ....... F16H 57/02; F16H 57/037; F16H 48/38; F16H 48/382
USPC ............ 475/230, 231; 74/444, 446, 447, 451; 464/172, 183
See application file for complete search history.

(56) References Cited

U.S. PATENT DOCUMENTS

| | | | | |
|---|---|---|---|---|
| 7,452,006 | B2* | 11/2008 | Kohda | ............ 285/316 |
| 2012/0280489 | A1* | 11/2012 | Bundy et al. | .............. 285/91 |

FOREIGN PATENT DOCUMENTS

| | | | | |
|---|---|---|---|---|
| CN | 103032556 | * | 4/2013 | ............. F16H 57/029 |
| JP | 2001-141038 | * | 5/2001 | .............. F16H 58/02 |
| JP | 2001-141038 | * | 11/2001 | .............. F16H 48/08 |
| JP | 3751488 B2 | | 3/2006 | |
| JP | 2013-072524 A | | 4/2013 | |

* cited by examiner

*Primary Examiner* — Robert Hodge
*Assistant Examiner* — Stacey Fluhart
(74) *Attorney, Agent, or Firm* — Carrier Blackman & Associates, P.C.; Joseph P. Carrier; William D. Blackman

(57) ABSTRACT

In a differential device, an outer tube portion is formed in one of a side gear and a sleeve, and an inner tube portion fitted to an inner periphery of the outer tube portion is formed in the other. An engagement portion is provided in the outer tube portion. A key member movable between a first position where the member is detached from the engagement portion to allow withdrawal of the sleeve and a second position where the member is engaged with the engagement portion, is attached to the inner tube portion. The member is forcibly held at the second position by a drive shaft when the shaft is fitted and inserted into the sleeve to be spline-fitted to the gear. Accordingly, a differential gear mechanism is disassembled by removing the sleeves from the gears and when the shafts are attached, connection between the sleeves and the gears is ensured.

8 Claims, 12 Drawing Sheets

DIFFERENTIAL DEVICE

BACKGROUND OF THE INVENTION

1. Field of the Invention

The present invention relates to an improvement of a differential device comprising: a differential gear mechanism; and an integrated differential case housing the differential gear mechanism, the differential case including: first and second bearing bosses formed integrally therewith on one side portion and another side portion of the differential case and aligned on a same axis to be rotatably supported by a transmission case; a work window for inserting the differential gear mechanism, the work window being provided in a peripheral wall of the differential case; a pair of sleeves being fitted to the first and second bearing bosses from sides of outer ends thereof and being connected to a pair of left and right side gears of the differential gear mechanism; oil seals being set between outer end portions of the sleeves which protrude from the first and second bearing bosses and the transmission case; and left and right drive shafts, which are fitted and inserted into the sleeves, being spline-fitted to the pair of side gears.

2. Description of the Related Art

Such a differential device is known as disclosed in Japanese Patent No. 3751488 and Japanese Patent Application Laid-open No. 2013-72524.

In the above-described differential device, after the differential gear mechanism including the side gears is incorporated into the integrated differential case through the work window, the sleeves are fitted and inserted into the first and second bearing bosses from outside thereof to be spline-fitted to the side gears. In other words, if the side gear and the sleeve are integrated, a total length thereof becomes longer than an inside diameter of the integrated differential case, and the side gear and the sleeve cannot be incorporated into the differential case.

In the conventional differential device, the sleeve is fastened to the side gear by pressure welding or adhesive bonding at the time of assembly. Accordingly, in the case where an examination or the like has revealed a need for replacement of a component after the assembly, the differential gear mechanism is difficult to disassemble.

SUMMARY OF THE INVENTION

The present invention has been made in view of the above-described circumstances, and an object of the present invention is to provide a differential device in which a differential gear mechanism can be disassembled by removing sleeves from side gears even after assembly and which can ensure connection between the sleeves and the side gears in a state in which drive shafts are attached.

In order to achieve the object, according to a first aspect of the present invention, there is provided a differential device comprising: a differential gear mechanism; and an integrated differential case housing the differential gear mechanism, the differential case including: first and second bearing bosses formed integrally therewith on one side portion and another side portion of the differential case and aligned on a same axis to be rotatably supported by a transmission case; a work window for inserting the differential gear mechanism, the work window being provided in a peripheral wall of the differential case; and a pair of sleeves fitted to the first and second bearing bosses from sides of outer ends thereof and connected to a pair of left and right side gears of the differential gear mechanism, wherein oil seals are to be set between outer end portions of the sleeves which protrude from the first and second bearing bosses and the transmission case, and left and right drive shaft are to be fitted and inserted into the sleeves and to be spline-fitted to the pair of side gears, wherein an outer tube portion is formed in one of the side gear and the sleeve, and an inner tube portion fitted to an inner periphery of the outer tube portion is formed in the other, an engagement portion is provided in the outer tube portion, a key member capable of moving between a first position where the key member is detached from the engagement portion to allow withdrawal of the sleeve and a second position where the key member is engaged with the engagement portion to prevent falling-out of the sleeve, is attached to the inner tube portion, and the key member is forcibly held at the second position by the drive shaft when the drive shaft is fitted and inserted into the sleeve to be spline-fitted to the side gear.

According to the first aspect of the present invention, even after assembly, if the drive shaft has not been attached yet, the key member is moved to the first position. Thus, the sleeve is released from connection with the side gear, and can be withdrawn. Accordingly, the differential gear mechanism can be disassembled, and a component thereof can be replaced. Moreover, in a state in which the drive shaft is attached, the key member is forcibly held at the second position by the drive shaft, and therefore the sleeve can be connected to the side gear.

According to a second aspect of the present invention, in addition to the first aspect, the engagement portion comprises an annular keyway formed in an inner peripheral surface of the outer tube portion such that a radially outer end portion of the key member engages with the keyway when the key member occupies the second position, and the drive shaft is spline-fitted to the sleeve.

According to the second aspect of the present invention, the engagement portion is formed of an annular keyway formed in the inner peripheral surface of the outer tube portion such that a radially outer end portion of the key member engages with the keyway when the key member occupies the second position. Accordingly, the key member can be smoothly moved to the second position. Also, since the drive shaft spline-fitted to the side gear is also spline-fitted to the sleeve, the sleeve can be rotated together with the side gear.

According to a third aspect of the present invention, in addition to the first aspect, the engagement portion comprises a key hole formed in an inner peripheral surface of the outer tube portion such that a radially outer end portion of the key member engages with the key hole to cause the key member and the outer tube portion to be connected even in a direction of rotation when the key member occupies the second position.

According to the third aspect of the present invention, when the key member is moved to the second position, the key member engages with the key hole, and the key member and the outer tube portion are connected even in the direction of rotation. Accordingly, the sleeve can be connected to the side gear even in the direction of rotation, and the drive shaft does not need to be spline-fitted to the sleeve.

According to a fourth aspect of the present invention, in addition to any one of the first to third aspects, a seal member for shutting off communication between a periphery of the key member and an inside of the differential case is set in a fitting portion between the outer tube portion and the inner tube portion.

According to the fourth aspect of the present invention, the lubricating oil in the differential case can be prevented from flowing out of the periphery of the key member by the above-described seal member.

According to a fifth aspect of the present invention, there is provided a differential device comprising: a differential gear mechanism; and an integrated differential case housing the differential gear mechanism, the differential case including: first and second bearing bosses formed integrally therewith on one side portion and another side portion of the differential case and aligned on a same axis to be rotatably supported by a transmission case; a work window for inserting the differential gear mechanism, the work window being provided in a peripheral wall of the differential case; and a pair of sleeves fitted to the first and second bearing bosses from sides of outer ends thereof and connected to a pair of left and right side gears of the differential gear mechanism, wherein oil seals are to be set between outer end portions of the sleeves which protrude from the first and second bearing bosses and the transmission case, and left and right drive shafts are to be fitted and inserted into the sleeves and to be spline-fitted to the pair of side gears, wherein an outer tube portion is formed in one of the side gear and the sleeve, and an inner tube portion fitted to an inner periphery of the outer tube portion is formed in the other, a fixed engagement portion is formed on an inner periphery of the outer tube portion, a movable engagement portion is formed on the inner tube portion, the movable engagement portion being capable of elastically deforming to move between a first position where the movable engagement portion is detached from the fixed engagement portion to allow withdrawal of the sleeve and a second position where the movable engagement portion is engaged with the fixed engagement portion to prevent falling-out of the sleeves, and having biasing force toward the first position, and the movable engagement portion is radially expanded by the drive shaft and forcibly held at the second position when the drive shaft is spline-fitted to the side gear.

According to the fifth aspect of the present invention, even after assembly, if the drive shaft has not been attached yet, the movable engagement portion is held at the first position by the elastic biasing force thereof. Thus, the sleeve is released from connection with the side gear, and can be withdrawn. Accordingly, the differential gear mechanism can be disassembled, and a component thereof can be replaced. Moreover, in a state in which the drive shaft is attached, the movable engagement portion is forcibly moved to and held at the second position by the drive shaft, and therefore the sleeve can be connected to the side gear.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Hereinafter, embodiments of the present invention will be described based on the accompanying drawings.

Figure 1:
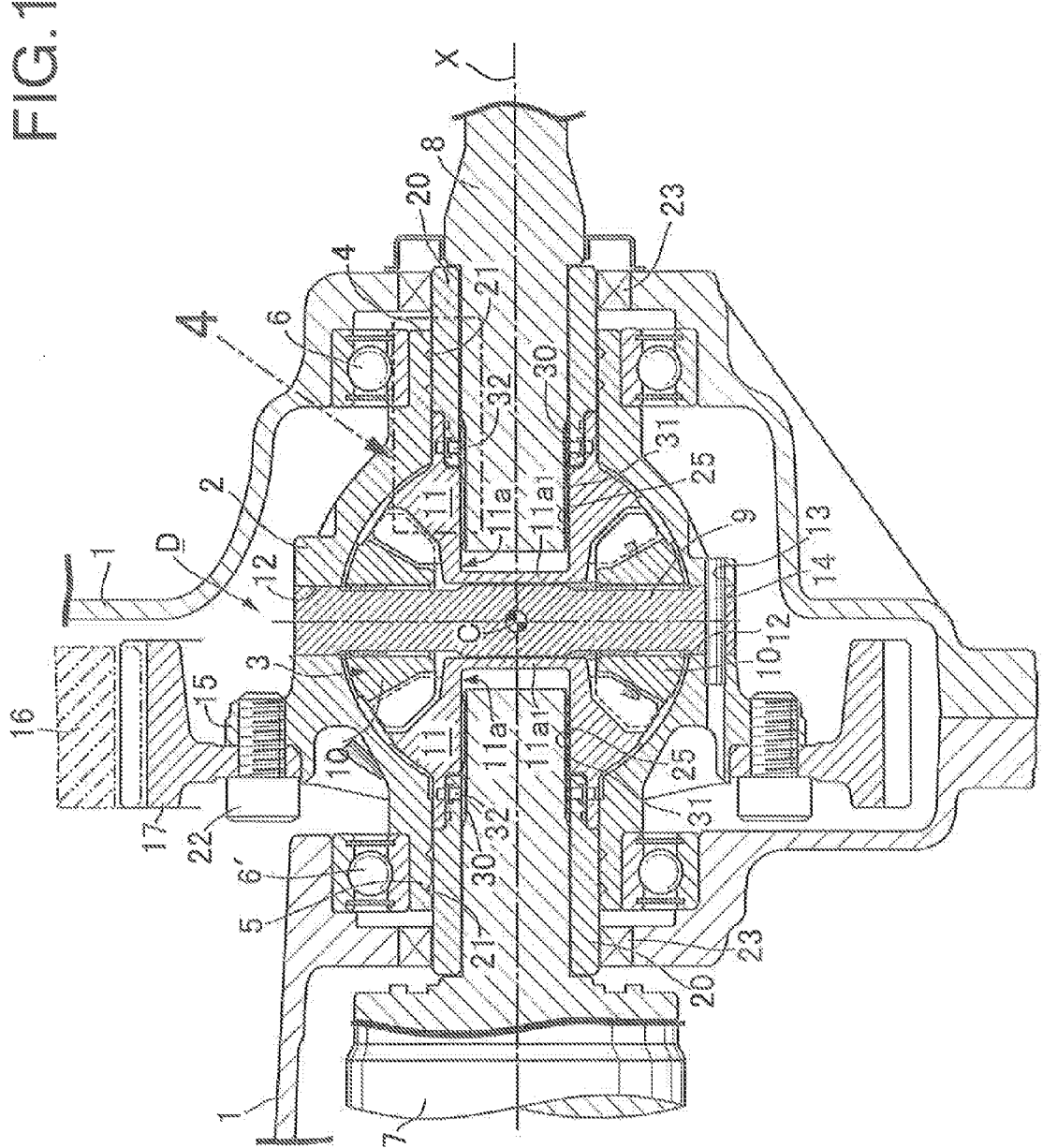
FIG. 1 is a longitudinal sectional elevation view of a differential device according to a first embodiment of the present invention.

First, a first embodiment of the present invention shown in FIGS. 1 to 6 will be described. In FIG. 1, a differential device D is housed in a transmission case 1 of an automobile. This differential device D includes an integrated differential case 2 and a differential gear mechanism 3 housed in this differential case 2. On a right side portion and a left side portion of the differential case 2, a first bearing boss 4 and a second bearing boss 5 aligned on the same axis X are formed integrally. These first and second bearing bosses 4, 5 are supported by the transmission case 1 via bearings 6, 6'.

The differential gear mechanism 3 includes a pinion shaft 9 held by the differential case 2 to pass through a center C of the differential case 2 while being orthogonal to the axis X, a pair of pinion gears 10 supported by the pinion shaft 9, a pair of side gears 11 meshing with the pinion gears 10, and a pair of sleeves 20 connected to hubs 11a of the side gears 11 and rotatably supported by the first and second bearing bosses 4, 5, respectively. A back face of each gear is rotatably supported by a spherical inner surface of the differential case 2. Helical lubrication grooves 21 are formed in inner peripheral surfaces of the first and second bearing bosses 4, 5. A structure for connecting the side gear 11 and the sleeve 20 will be described later.

The sleeves 20 are configured such that outer end portions thereof protrude from the corresponding bearing bosses 4, 5 outward, and oil seals 23 are interposed between the outer end portions and the transmission case 1, respectively.

The pinion shaft 9 is held by a pair of supporting holes 12 in an outer peripheral portion of the differential case 2. The outer peripheral portion of the differential case 2 is provided with a pin hole 13 laterally passing through the outer peripheral portion to be orthogonal to one of the supporting holes 12. A falling-off prevention pin 14 press-fitted into the pin hole 13 passes through the pinion shaft 9. This achieves prevention of the falling off of the pinion shaft 9 from the supporting holes 12.

Moreover, the differential case 2 has an annular flange 15 formed integrally therewith on an intermediate portion which is offset from the center C of the differential case 2 toward the second bearing boss 5 side. A ring gear 17 meshing with an output gear 16 of a gearbox is fastened to the flange 15 with a bolt 22.

Figure 2:
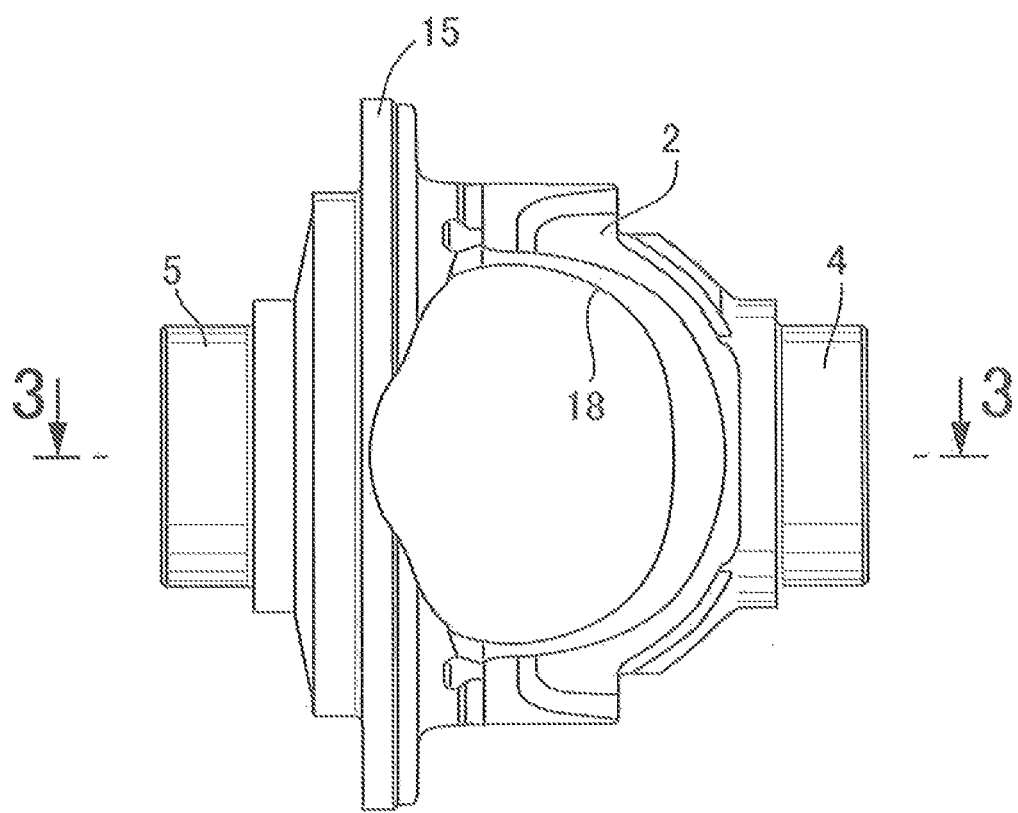
FIG. 2 is an elevation view of a differential case of the above-described differential device.
Figure 3:
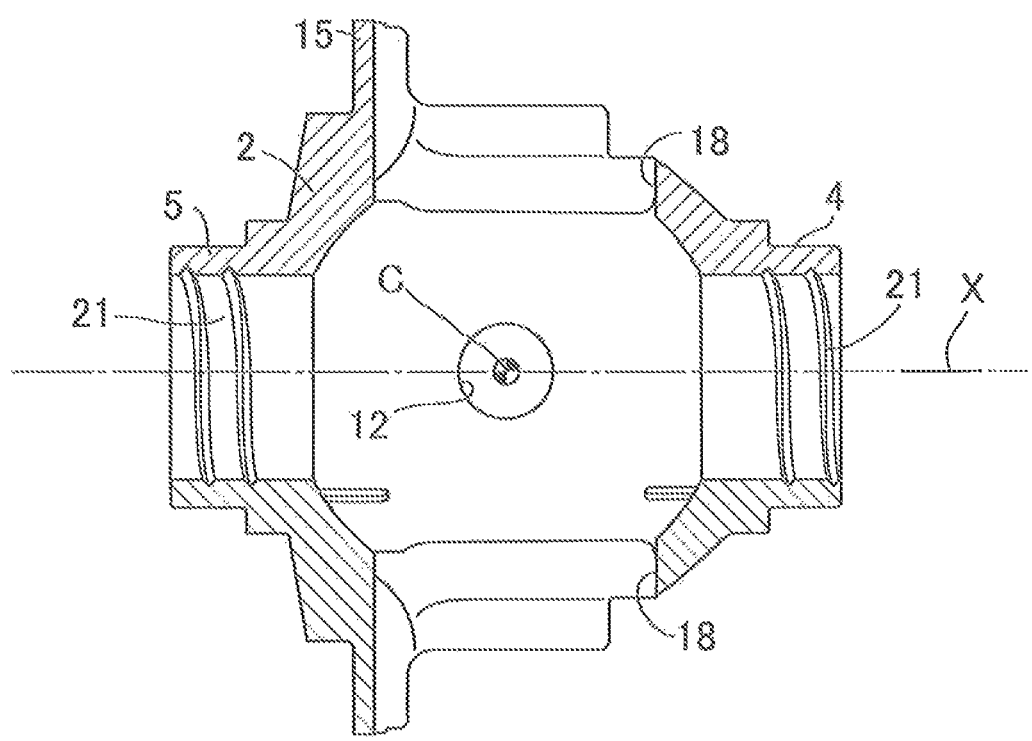
FIG. 3 is a sectional view taken along line 3-3 of FIG. 2.

As shown in FIGS. 2 and 3, in portions of a peripheral wall of the differential case 2 which face each other on a diametral line orthogonal to the axis X, a pair of work windows 18 for machining the spherical inner surface of the differential case 2 and for incorporating the differential gear mechanism 3 into the differential case 2 are provided.

Figure 4:
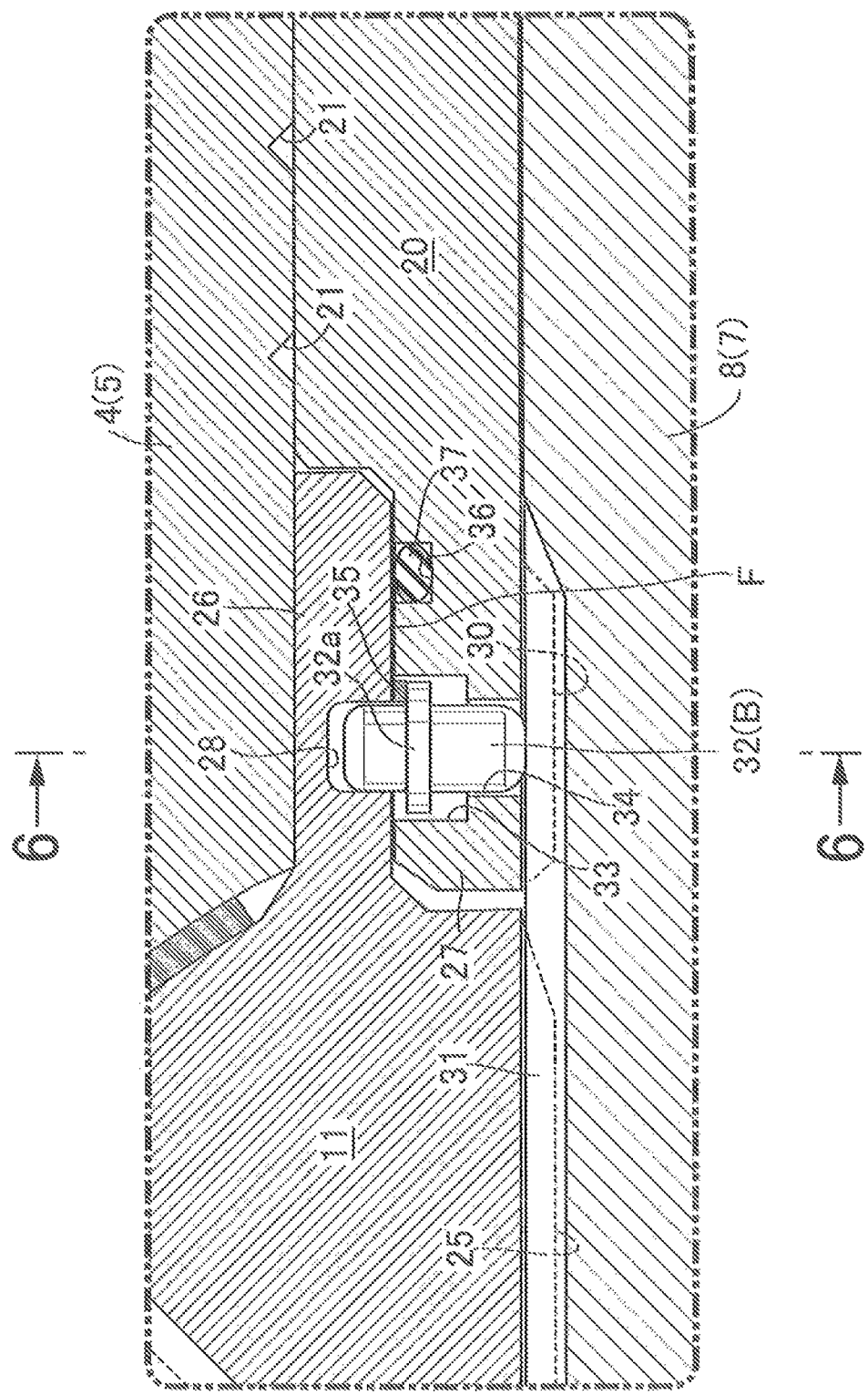
FIG. 4 is an enlarged view of a portion 4 of FIG. 1 and shows a state in which a sleeve is connected to a side gear.
Figure 5:
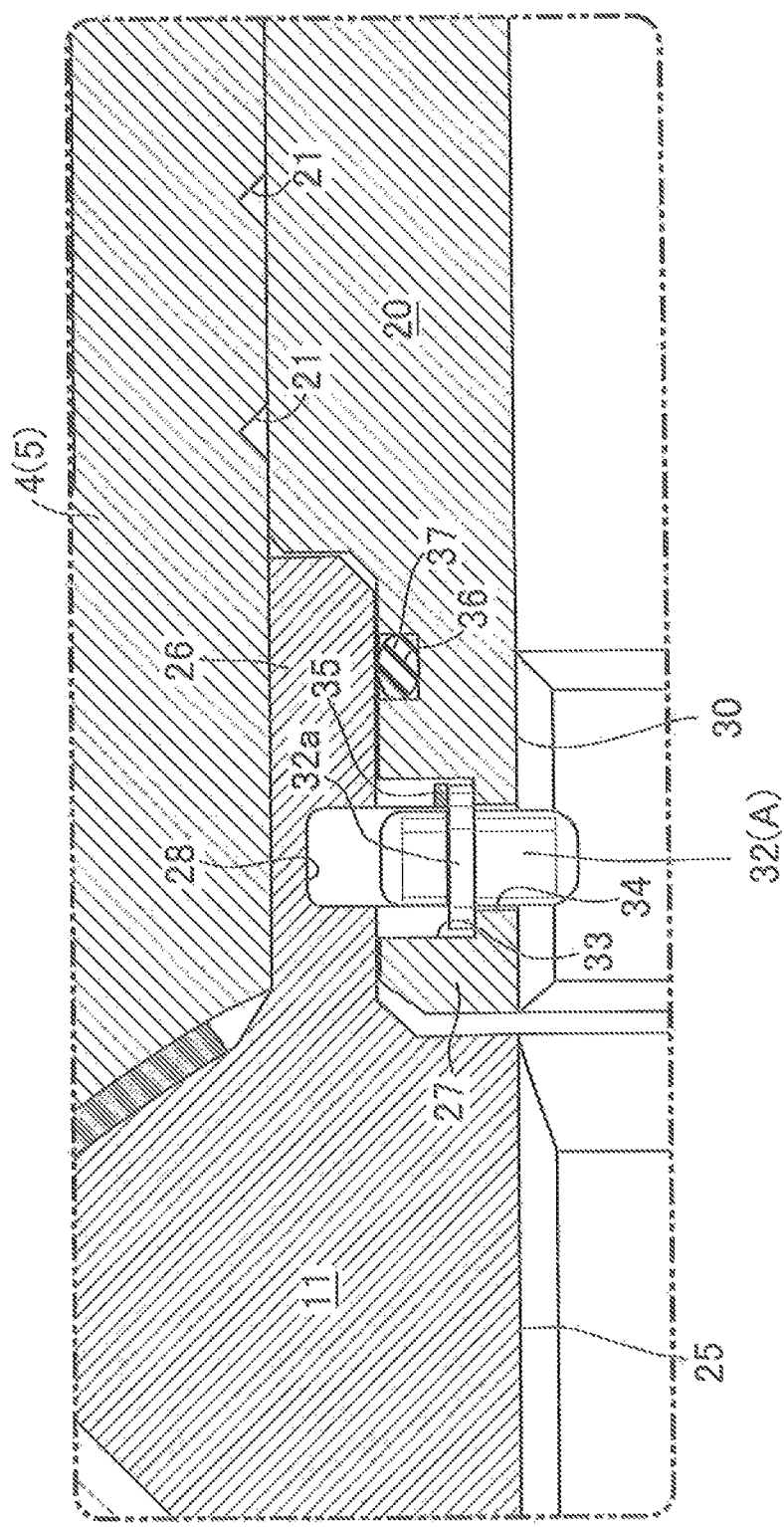
FIG. 5 is an operation explanatory view corresponding to FIG. 4 and shows a state in which the sleeve is not connected to the side gear.
Figure 6:
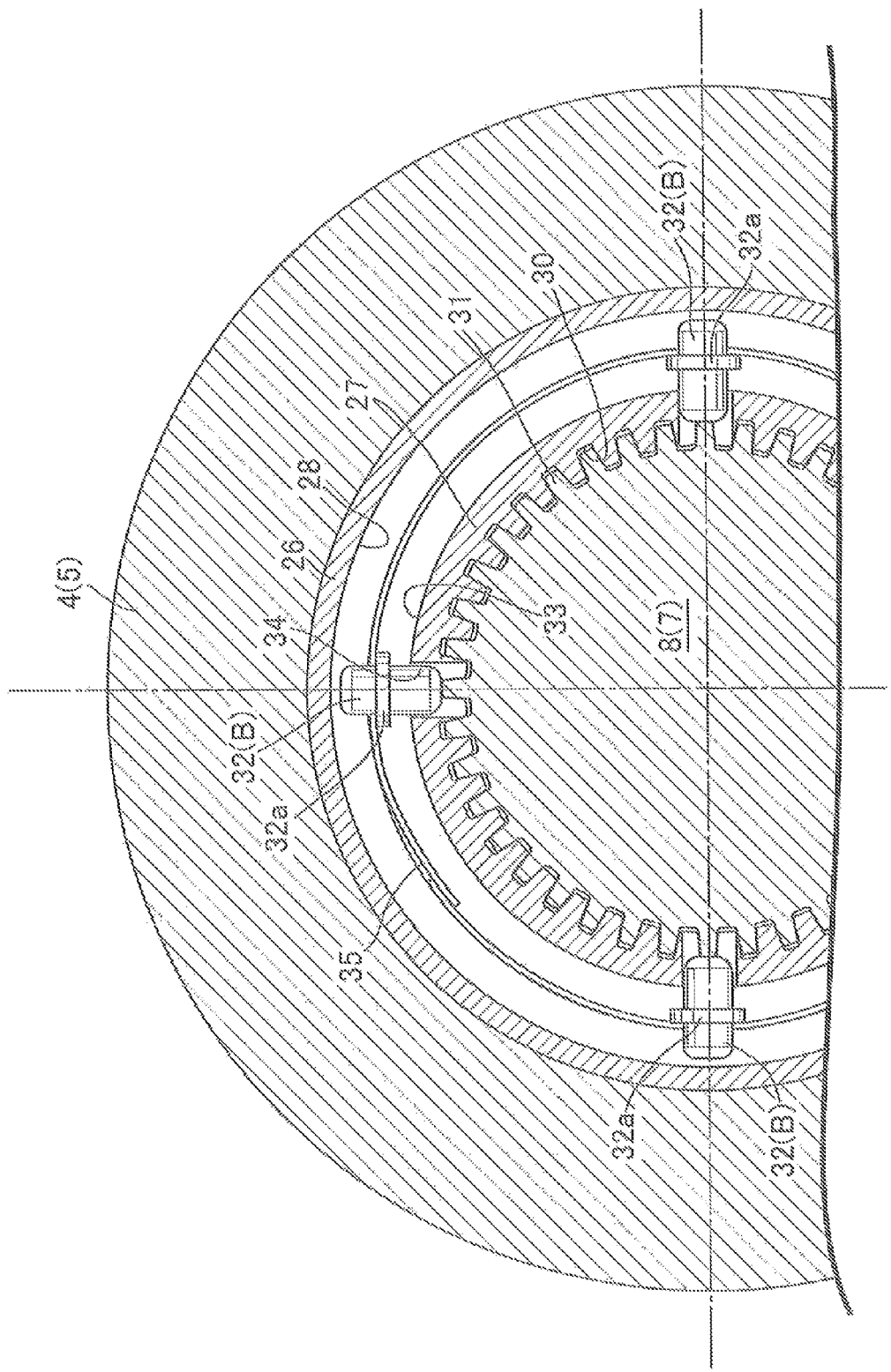
FIG. 6 is a sectional view taken along line 6-6 of FIG. 4.

Next, a structure for connecting the side gear 11 and the sleeve 20 will be described with reference to FIGS. 4 to 6.

The hub 11a of the side gear 11 is formed in a shape of a bottomed cylinder having a bottom portion $11a_1$ facing toward the pinion shaft 9. On an inner periphery of the hub 11a, a first splined hole 25 is formed. Moreover, on the back face of the side gear 11, an outer tube portion 26 rotatably supported by the inner peripheral surface of the corresponding bearing boss 4 or 5 is integrally provided in a protruding manner. In an inner peripheral surface of the outer tube portion 26, an annular keyway 28 is provided.

On the other hand, an inner end portion of the sleeve 20 is formed to serve as an inner tube portion 27 which is fitted to the inner peripheral surface of the above-described outer tube portion 26. Moreover, on an inner periphery of the inner tube portion 27, a second splined hole 30 is formed which is coaxially aligned with the first splined hole 25 and which has the same diameter as the first splined hole 25. The splined shaft 31 of the drive shaft 7 or 8 which is fitted into the sleeve 20 from the outside thereof is fitted to the first and second splined holes 25, 30 at the same time.

A plurality of key members 32 which are equally spaced in the peripheral direction thereof and which move between first and second positions A, B in the radial direction are attached to the inner tube portion 27 as follows. Specifically, on an outer periphery of the inner tube portion 27, an annular groove 33 facing the keyway 28 and a plurality of guide holes 34 which are equally spaced in the peripheral direction of the inner tube portion 27 and which allow the above-described annular groove 33 to communicate with bottom lands of the second splined hole 30 are provided.

The key member 32 is formed in the form of a pin having a flange 32a in an intermediate portion and moves between the first and second positions A, B along the guide hole 34. At a first position A (see FIG. 5), an inner end portion of the key member 32 is protruded from the bottom land of the second splined hole 30 with the flange 32a being in contact with a groove bottom of the annular groove 33, and an outer end portion of the key member 32 is retracted from the keyway 28 to allow the withdrawal of the sleeve 20. At a second position B (see FIGS. 4 and 6), the inner end surface of the key member 32 is made flush with the bottom land of the second splined hole 30, and the outer end portion of the key member 32 is engaged with the keyway 28 to prevent the falling-out of the sleeve 20. An annular spring 35 which pushes the flanges 32a inward in the radial direction and biases the key members 32 toward the first positions A is attached to the annular groove 33. The inner end portion of the key member 32 is formed in a hemispherical shape. When the splined shafts 31 of the drive shafts 7, 8 are fitted to the second splined holes 30, top lands of the splined shafts 31 push the inner end portions of the key members 32 to move the key members 32 from the first positions A to the second positions B.

An O-ring 37 for shutting off communication between peripheries of the key members 32 and the inside of the differential case 2 is set in a fitting portion F between the outer tube portion 26 and the inner tube portion 27. Specifically, an annular seal groove 36 is provided more outward than the annular groove 33 in an axial direction in the outer peripheral surface of the inner tube portion 27, and the O-ring 37 which comes in tight contact with the inner peripheral surface of the outer tube portion 26 is attached to the seal groove 36.

Next, operations of this embodiment will be described.

When the differential device D is assembled, the side gears 11 are first inserted into the differential case 2 through the work window 18, and the outer tube portions 26 are fitted to the inner peripheral surfaces of the corresponding bearing bosses 4, 5. Subsequently, the pinion gears 10 are also inserted into the differential case 2 through the work window 18 and set at predetermined positions, and the pinion shaft 9 is attached to the differential case 2.

After that, each sleeve 20 having the key members 32 and the annular spring 35 attached to the inner tube portion 27 is fitted and inserted into the corresponding bearing boss 4 or 5 from the outside thereof, and the inner tube portion 27 is fitted to the inner peripheral surface of the outer tube portion 26 of the side gear 11. At this time, the key members 32 are held at the first positions A by the annular spring 35, and therefore do not interfere with the fitting of the inner tube portion 27 to the outer tube portion 26. At the same time, the O-ring 37 attach to the outer periphery of the inner tube portion 27 comes in tight contact with the inner peripheral surface of the outer tube portion 26. Frictional force between the O-ring 37 and the outer tube portion 26 can prevent the falling-off of the sleeves 20 from the bearing bosses 4, 5 even when the differential device D is being transported in a stand-alone state.

Subsequently, the differential device D, together with an unillustrated gearbox, is incorporated into the transmission case 1. The bearings 6, 6' are set between the first and second bearing bosses 4, 5 and the transmission case 1, and the oil seals 23 are set between the sleeves 20 and the transmission case 1. After the transmission case 1 is mounted on the automobile, the drive shafts 7, 8 are fitted and inserted into the sleeves 20, and the splined shafts 31 of the drive shafts 7, 8 are fitted to the second splined holes 30 and the first splined holes 25 in order.

Thus, when the splined shaft 31 is fitted to the second splined hole 30, top lands of the splined shaft 31 push the inner end portions of the key members 32. Accordingly, the key members 32 move from the first positions A to the second positions B against a biasing force of the annular spring 35, and the outer end portions of the key members 32 are engaged with the keyway 28 of the outer tube portion 26. As a result, the inner tube portion 27, i.e., the sleeve 20, is connected to the outer tube portion 26, i.e., the side gear 11, via the key members 32 in the axial direction, and the falling-out of the sleeve 20 can be prevented.

After the above-described assembly, in the case where an examination or the like has revealed a need for the replacement of a component of the differential gear mechanism 3, the splined shafts 31 are detach from the second splined holes 30 by withdrawing the drive shafts 7, 8 from the sleeves 20. This causes the key members 32 to be returned from the second positions B to the first positions A by the biasing force of the annular spring 35 and retracted from the keyway 28. Accordingly, the connection between the outer tube portion 26 and the inner tube portion 27 with the key members 32 is released. The withdrawal of the sleeves 20 from the outer tube portions 26 and the bearing bosses 4, 5 allows the differential gear mechanism 3 to be disassembled through the work windows 18 and allows the component to be replaced.

Moreover, after the assembly, when lubricating oil is injected into the transmission case 1, the lubricating oil fills the inside of the differential case 2 through the work windows 18 to be used for lubrication between various portions of the differential gear mechanism 3. At this time, the lubricating oil in the transmission case 1 is prevented from flowing out of the outer peripheries of the sleeves 20 by the oil seals 23, and the lubricating oil in the differential case 2 is prevented from flowing out of the peripheries of the key members 32 by the O-rings 37. Accordingly, even when the drive shafts 7, 8 are detached for maintenance or the like after the assembly of the automobile is completed, the lubricating oil in the transmission case 1 and the differential case 2 does not flow out. Thus, lubricating oil does not need to be drained every time the drive shafts 7, 8 are removed, and ease of maintenance is good.

Figure 7:
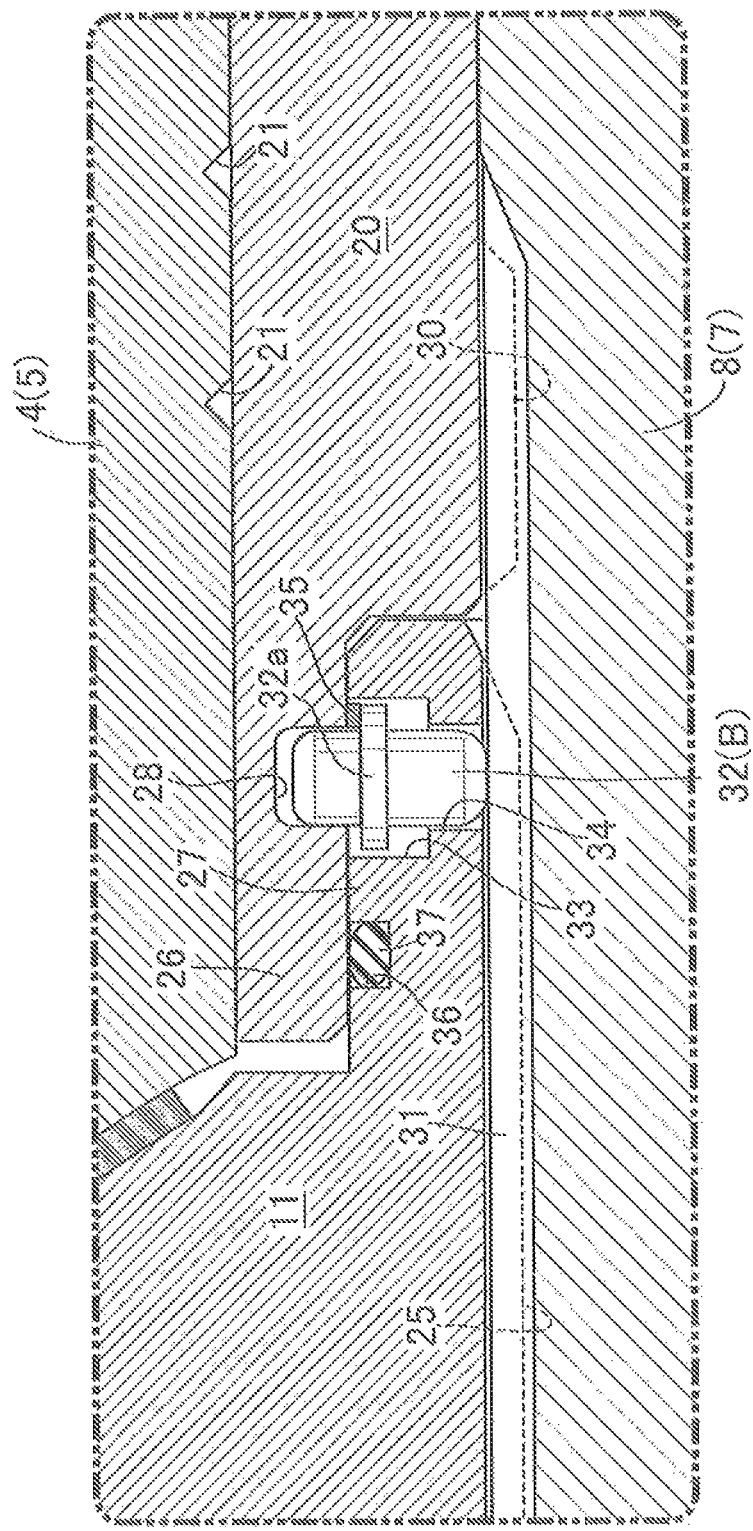
FIG. 7 is a view showing a differential device according to a second embodiment of the present invention and corresponding to FIG. 4.

Next, a second embodiment of the present invention shown in FIG. 7 will be described.

This second embodiment differs from the first embodiment in that the outer tube portion 26 is formed in the sleeve 20, with the inner tube portion 27 being formed in the side gear 11. In connection with this, the first splined hole 25 of the side gear 11 is formed to be extended to the inner periphery of the inner tube portion 27. The fitting of the splined shaft 31 of the drive shaft 7 or 8 to the first splined hole 25 causes the key members 32 to move from the first positions A to the second positions B. On the inner periphery of the sleeve 20, the second splined hole 30 to which the splined shaft 31 is fitted is formed. With regard to the O-ring 37, to shut off communication between the peripheries of the key members 32 and the inside of the differential case 2, the annular seal groove 36 is provided more inward than the key members 32 in the axial direction in the outer periphery of the inner tube portion 27, and the O-ring 37 which comes in tight contact with the inner peripheral surface of the outer tube portion 26 is attached to the seal groove 36. Except for the above-described points, the configuration of this embodiment is similar to that of the first embodiment. Accordingly, portions corresponding to those of the first embodiment are denoted by the same reference numerals in FIG. 7, and explanations which have already been made in the first embodiment will be omitted.

This second embodiment can also achieve effects similar to those of the first embodiment.

Figure 8:
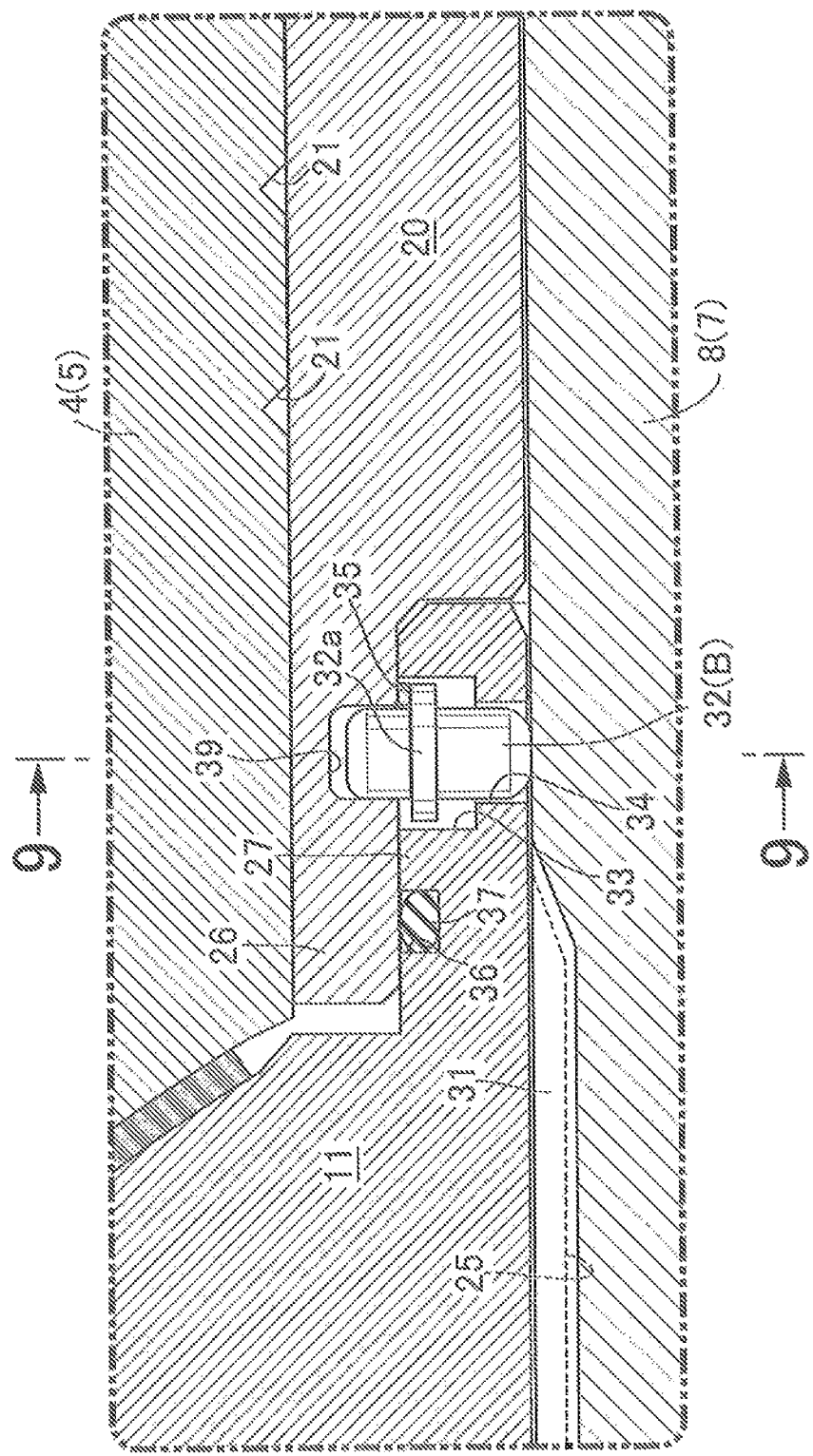
FIG. 8 is a view showing a differential device according to a third embodiment of the present invention and corresponding to FIG. 4.
Figure 9:
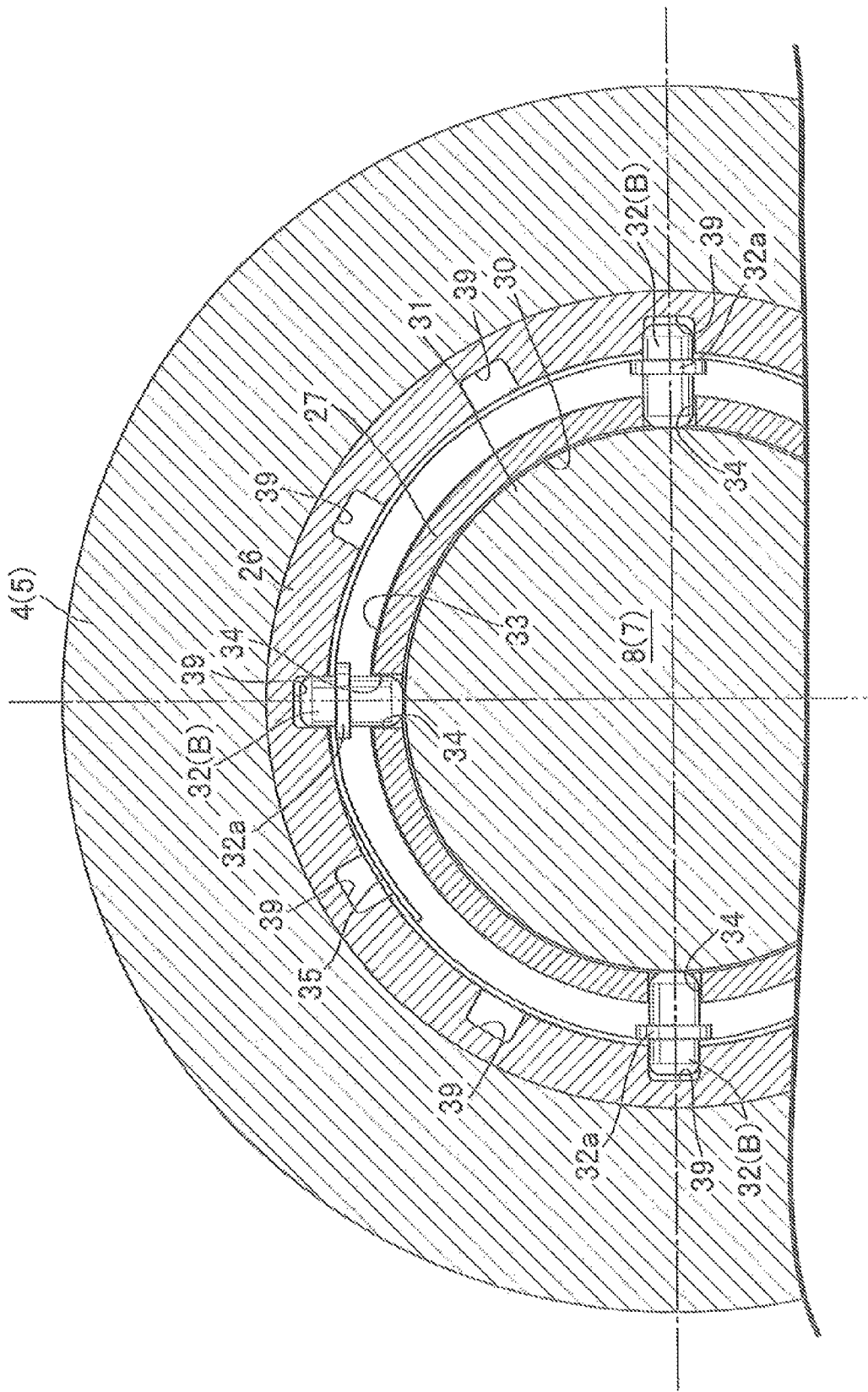
FIG. 9 is a sectional view taken along line 9-9 of FIG. 8.

Next, a third embodiment of the present invention shown in FIGS. 8 and 9 will be described.

In this third embodiment, instead of the annular keyway 28 of the second embodiment, a plurality of key holes 39 are formed in the inner peripheral surface of the outer tube portion 26. When the plurality of key members 32 occupy the second positions B, the outer end portions of the key members 32 engage with the plurality of key holes 39, respectively, to be connected to the outer tube portion 26 of the sleeve 20 even in the direction of rotation. Accordingly, the sleeve 20 does not need to have a splined hole which is fitted to the splined shaft 31 of the drive shaft 7 or 8. Except for the above-described points, the configuration of this embodiment is similar to that of the second embodiment. Accordingly, portions corresponding to those of the second embodiment are denoted by the same reference numerals in FIGS. 8 and 9, and explanations which have already been made in the second embodiment will be omitted.

This third embodiment can also achieve effects similar to those of the first embodiment.

Figure 10:
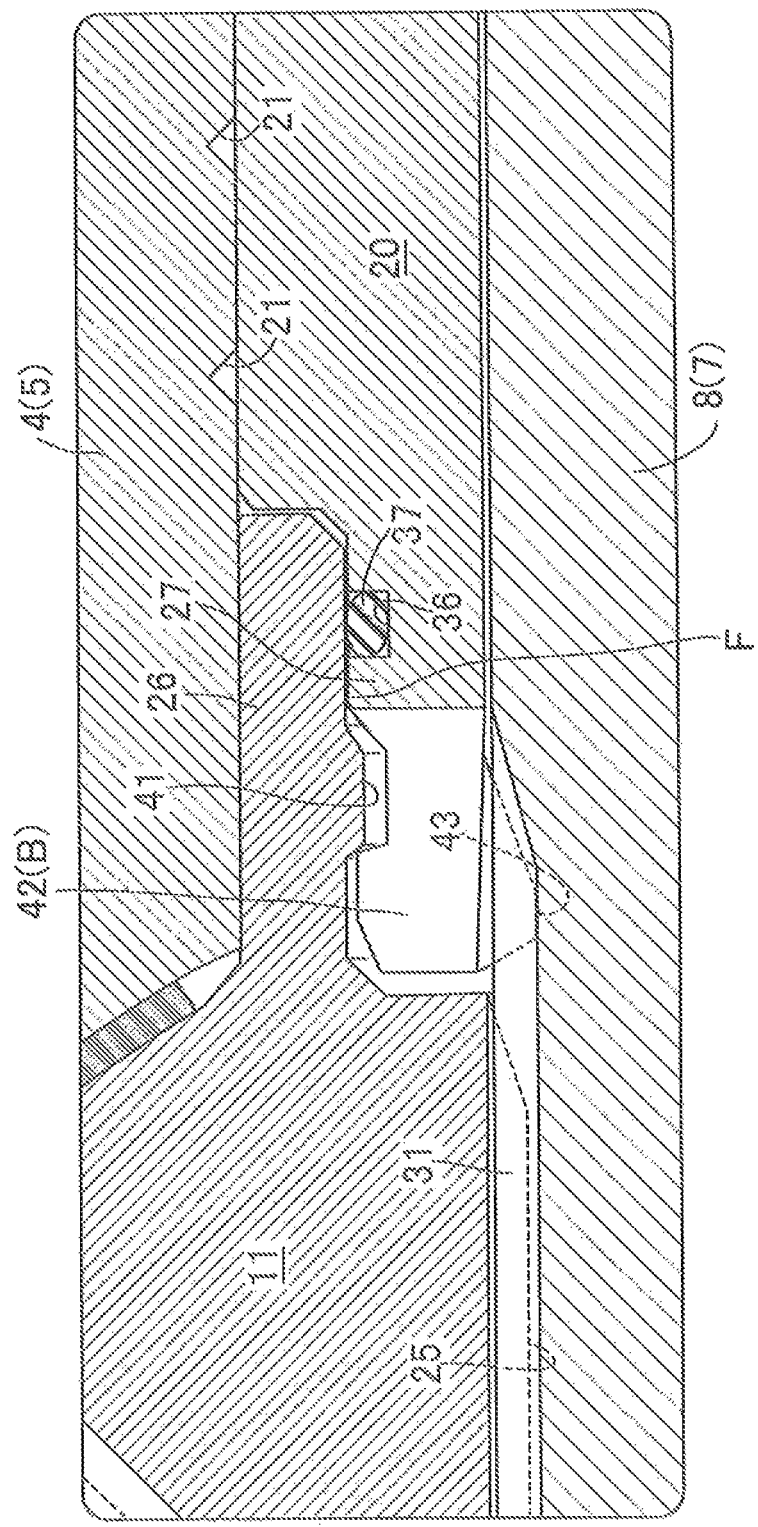
FIG. 10 is a view showing a differential device according to a fourth embodiment of the present invention and corresponding to FIG. 4.
Figure 11:
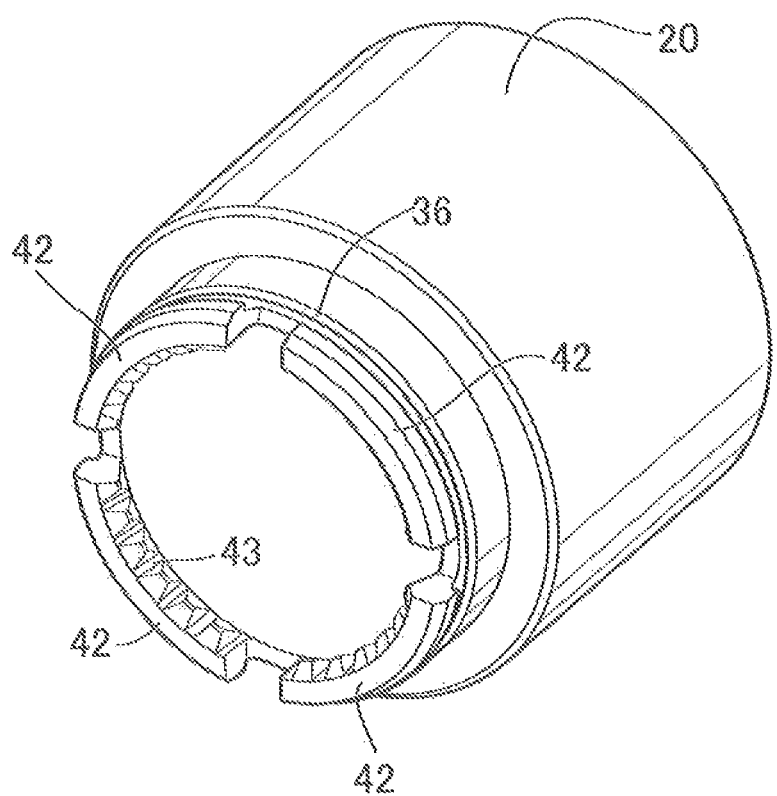
FIG. 11 is a perspective view of a sleeve of the fourth embodiment.
Figure 12:
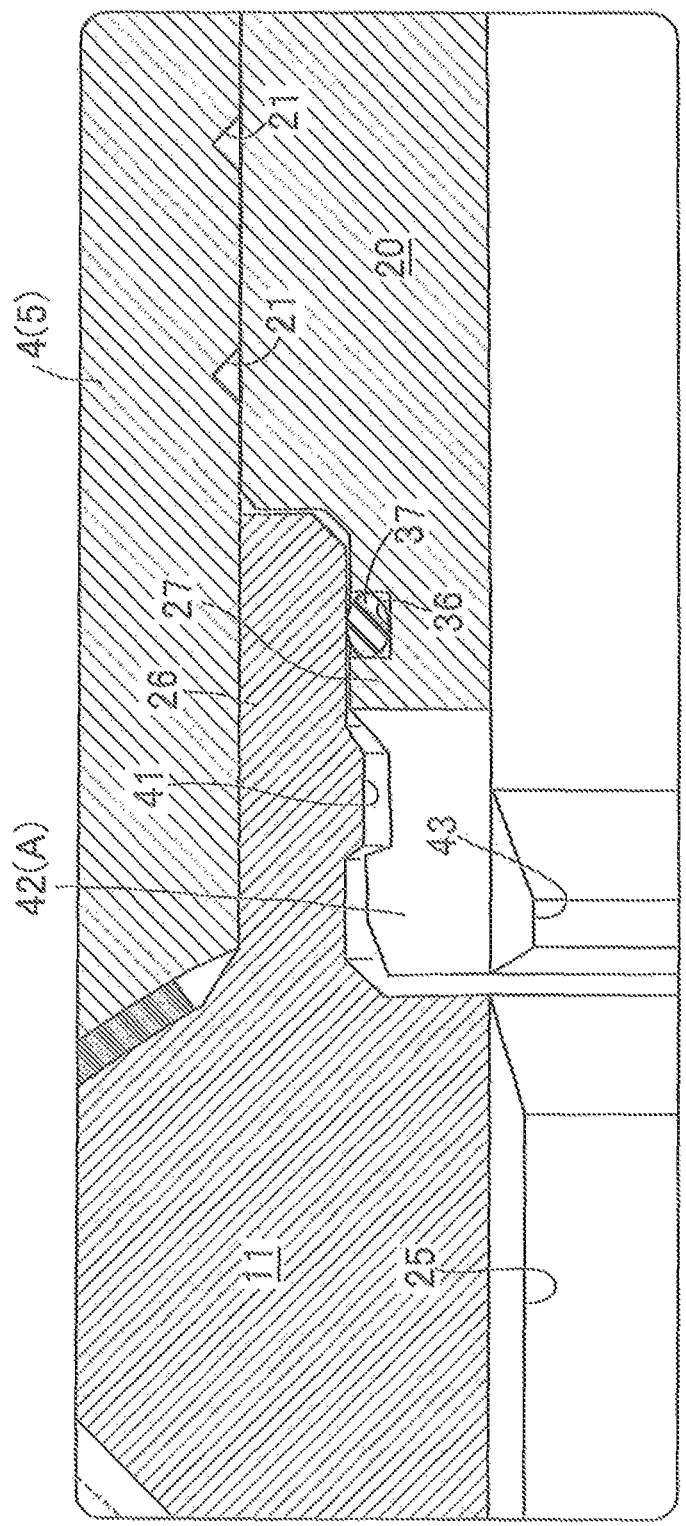
FIG. 12 is a view showing a state in which the sleeve is not connected to the side gear, and corresponding to FIG. 10.

Next, a fourth embodiment of the present invention shown in FIGS. 10 to 12 will be described.

In this fourth embodiment, the outer tube portion 26 is formed on one of the side gear 11 and the sleeve 20, and the inner tube portion 27 is formed on the other. Further, on the inner periphery of the outer tube portion 26, a fixed engagement portion 41 which is formed of an annular protrusion is formed; and, on the inner tube portion 27, a plurality of movable engagement portions 42 arranged along a peripheral direction of the inner tube portion 27 are formed. The movable engagement portions 42 can bend to move between first positions A corresponding to detachment from the fixed engagement portion 41 and second positions B corresponding to engagement with the fixed engagement portion 41. Elastic biasing force which biases the movable engagement portions 42 toward the first positions A is applied to the movable engagement portions 42.

An O-ring 37 for shutting off communication between a periphery of the fixed engagement portion 41 and the inside of the differential case 2 is set in a fitting portion F between the outer tube portion 26 and the inner tube portion 27. Specifically, an annular seal groove 36 is provided more outward than the fixed engagement portion 41 in an axial direction in the inner peripheral surface of the outer tube portion 26, and the O-ring 37 which comes in tight contact with the outer peripheral surface of the inner tube portion 27 is attached to the seal groove 36.

Moreover, on an inner periphery of the group of movable engagement portions 42, a third splined hole 43 is formed which is coaxially aligned with the first splined hole 25 of the side gear 11 and which has a smaller diameter than the splined shaft 31 of the drive shaft 7 or 8.

Thus, in a state in which the drive shafts 7, 8 do not exist in the sleeves 20, the movable engagement portions 42 are held at the first positions A by the elastic biasing forces thereof and detached from the fixed engagement portion 41. Accordingly, the sleeves 20 can be withdrawn from the bearing bosses 4, 5. Therefore, as in the previous embodiment, the differential gear mechanism 3 can be disassembled from the differential case 2.

When the drive shaft 7 or 8 is fitted and inserted into the sleeve 20 to fit the splined shaft 31 to the third splined hole 43 and the first splined hole 25 in order, the movable engagement portions 42 are radially expanded to the second positions B by the press-fitting of the splined shaft 31 because the third splined hole 43 is formed to have a smaller diameter than the splined shaft 31, and are engaged with the fixed engagement portion 41. Thus, the sleeve 20 can be prevented from detaching from the bearing boss 4 or 5.

The present invention is not limited to the above-described embodiments, but various design changes can be made without departing from the gist thereof. For example, in the above-described embodiments, the fastening of the ring gear 17 and the flange 15 with bolts may be replaced by joining by welding. Moreover, to prevent the lubricating oil in the differential case 2 from flowing out into the hubs 11a of the side gears 11, plugs may be press-fitted to the inner peripheries of the hubs 11a in a liquid tight manner instead of the bottom portions 11$a_1$ of the hubs 11a. Moreover, the key member 32 having the shape of a pin may be replaced by a key member having the shape of a ball or another shape.

What is claimed is:

1. A differential device comprising:
    a differential gear mechanism; and
    an integrated differential case which houses the differential gear mechanism, the differential case including: first and second bearing bosses formed integrally therewith on one side portion and another side portion of the differential case and aligned on a same axis to be rotatably supported by a transmission case; a work window for inserting the differential gear mechanism, the work window being provided in a peripheral wall of the differential case; and a pair of sleeves fitted to the first and second bearing bosses from sides of outer ends thereof and connected to a pair of left and right side gears of the differential gear mechanism,
    wherein oil seals are to be set between outer end portions of the sleeves which protrude from the first and second bearing bosses and the transmission case, and left and right drive shafts are to be fitted and inserted into the sleeves and to be spline-fitted to the pair of side gears,
    wherein for each said sleeve and the side gear corresponding thereto
    an outer tube portion is formed in one of the side gear and the sleeve, and an inner tube portion fitted to an inner periphery of the outer tube portion is formed in the other, an engagement portion is provided in the outer tube portion,
a key member capable of moving between a first position where the key member is detached from the engagement portion to allow withdrawal of the sleeve and a second position where the key member is engaged with the engagement portion to prevent falling-out of the sleeve, is attached to the inner tube portion,
a biasing device is provided for biasing the key member toward the first position, and
when the drive shaft is fitted and inserted into the sleeve and spline-fitted to the side gear the key member is forcibly held at the second position by the drive shaft, thereby to connect the side gear and the sleeve together to prevent falling-off of the sleeve, and when the drive shaft is detached from the side gear, the key member is moved back to the first position by biasing force of the biasing device, thereby to disconnect the side gear and the sleeve from each other to allow withdrawal of the sleeve.

2. The differential device according to claim 1, wherein the engagement portion comprises an annular keyway formed in an inner peripheral surface of the outer tube portion such that a radially outer end portion of the key member engages with the keyway when the key member occupies the second position, and the drive shaft is spline-fitted to the sleeve.

3. The differential device according to claim 2, wherein a seal member for shutting off communication between a periphery of the key member and an inside of the differential case is set in a fitting portion between the outer tube portion and the inner tube portion.

4. The differential device according to claim 1, wherein the engagement portion comprises a key hole formed in an inner peripheral surface of the outer tube portion such that a radially outer end portion of the key member engages with the key hole to cause the key member and the outer tube portion to be connected even in a direction of rotation when the key member occupies the second position.

5. The differential device according to claim 4, wherein a seal member for shutting off communication between a periphery of the key member and an inside of the differential case is set in a fitting portion between the outer tube portion and the inner tube portion.

6. The differential device according to claim 1, wherein a seal member for shutting off communication between a periphery of the key member and an inside of the differential case is set in a fitting portion between the outer tube portion and the inner tube portion.

7. The differential device according to claim 1, wherein the key member is formed as a pin having an outwardly extending projection at an intermediate portion thereof.

8. The differential device according to claim 1, wherein one end portion of the key member is disposed in a guide hole formed in the inner tube portion, and when the key member is in its first position a part of the one end portion projects from the guide hole, whereas when the key member is in its second position the part of the one end portion is engaged by the drive shaft and disposed in the guide hole through such engagement with the drive shaft.

* * * * *